United States Patent [19]

Hershfield

[11] Patent Number: 4,677,518
[45] Date of Patent: Jun. 30, 1987

[54] TRANSIENT VOLTAGE SURGE SUPPRESSOR

[75] Inventor: Walton N. Hershfield, Stevensville, Mont.

[73] Assignee: Power Integrity Corporation, Greensboro, N.C.

[21] Appl. No.: 619,605

[22] Filed: Jun. 11, 1984

[51] Int. Cl.$^4$ .............................................. H02H 3/22
[52] U.S. Cl. ...................................... 361/56; 361/118; 361/120
[58] Field of Search ................. 361/56, 111, 113, 117, 361/118, 120, 126, 127, 54, 91, 88, 89; 323/230, 231

[56] References Cited

U.S. PATENT DOCUMENTS

| 4,023,071 | 5/1977 | Fussell | 361/120 |
|---|---|---|---|
| 4,035,693 | 7/1977 | Luxa et al. | 361/127 |
| 4,419,711 | 12/1983 | Seguin | 361/56 |
| 4,434,396 | 2/1984 | Montague | 361/111 |

FOREIGN PATENT DOCUMENTS 601543 5/1948 United Kingdom .

OTHER PUBLICATIONS

*IEEE Standard Dictionary of Electrical and Electronics Terms,* Third Edition, 1984, p. 904.

Primary Examiner—A. D. Pellinen
Assistant Examiner—Todd DeBoer
Attorney, Agent, or Firm—Mason, Kolehmainen, Rathburn & Wyss

[57] ABSTRACT

A transient surge suppression system utilizes a negative resistance voltage breakdown device such as a gas discharge tube or a semiconductor device such as a SIDAC in series with a resistance element, preferably a non-linear resistance element, such as a varistor or Zener diode, to limit the amplitude of voltage transients applied to electrical equipment being protected. The breakdown device breaks down when a sufficiently high amplitude voltage transient is applied thereto, and the resistive element serves to protect the breakdown device from damage by excessive follow-on current. If a non-linear resistance device is used as the resistance element, the voltage across the combination is reduced at high currents. Several units may be cascaded to achieve sequential breakdown of multiple devices to thereby share the surge current among several devices and to reduce the dynamic impedance of the circuit and to multiply power dissipation capacity of the transient voltage surge suppression system.

16 Claims, 6 Drawing Figures

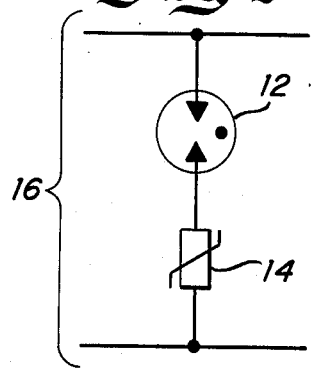
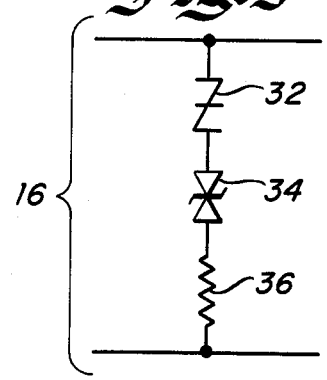
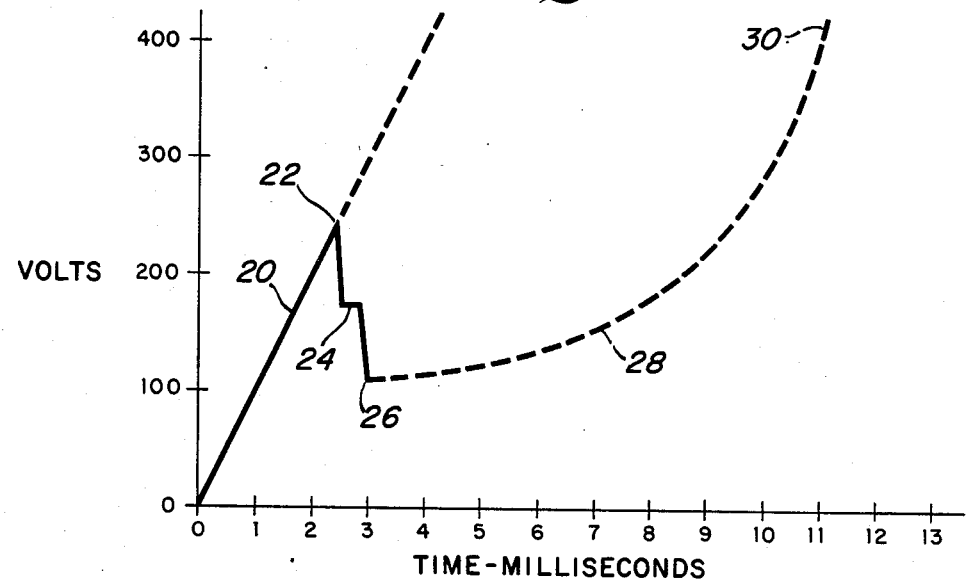
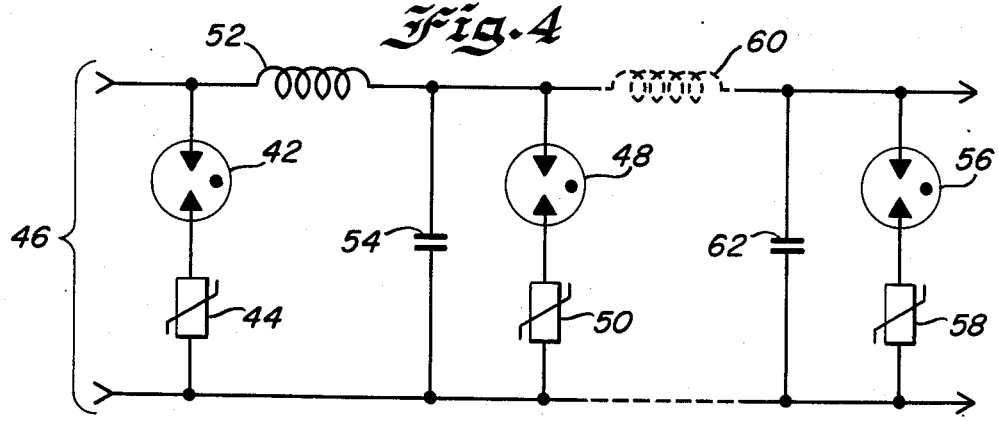

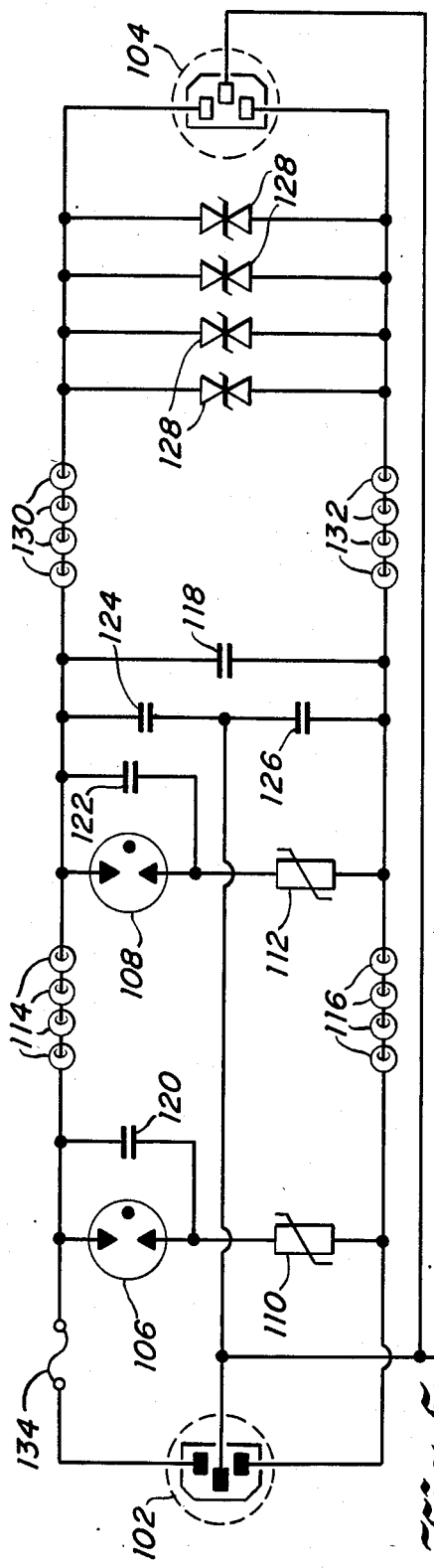
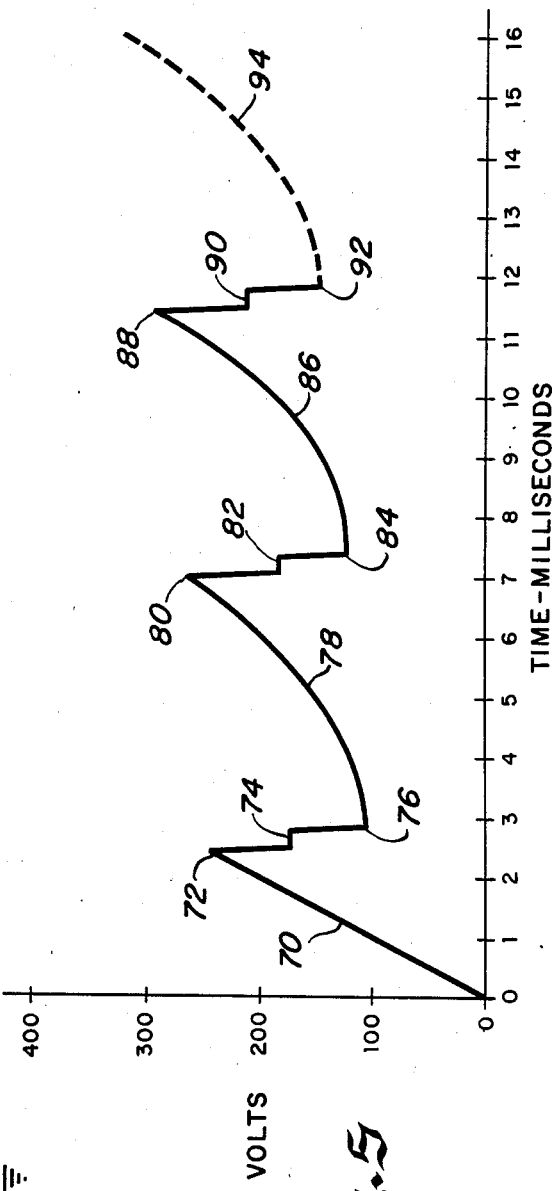
Fig. 6
Fig. 5

TRANSIENT VOLTAGE SURGE SUPPRESSOR

BACKGROUND OF THE INVENTION

A. Field of the Invention

This invention relates generally to electrical transient voltage surge suppression or energy absorbing devices, and more particularly to transient suppression systems that utilize a combination of transient suppression elements including negative resistance breakdown elements such as gas discharge tubes and semiconductor breakdown devices, and non-linear resistance elements, such as varistors or Zener diodes, to provide improved transient suppression.

B. Description of the Prior Art

Various transient suppression circuits are known. Among these are triggered or breakdown devices sometimes known as negative resistance devices that include, for example, gas discharge tubes and semiconductor voltage controlled switches such as a two-terminal device known as a SIDAC. Such breakdown devices have the characteristic that when the voltage applied across their terminals exceeds a predetermined breakdown voltage or trigger voltage, the device switches to a conductive state wherein the resistance decreases and the voltage across the terminals of the device is substantially reduced. The non-linear resistance elements, wherein the resistance is a function of applied voltage and current, include Zener diodes, selenium stacks, voltage-dependent resistors and varistors. Such non-linear resistance elements have a dynamic resistance logrithmically proprotional to the current density within the device. These characteristics vary between devices. For example, the dynamic resistance of the Zener diode varies such that the clamping voltage of the device remains substantially constant over a wide range of current densities. Thus, since the voltage across such non-linear resistance devices tends to rise more slowly than the voltage across a linear resistance, such devices have also been used and are preferred as transient suppressors.

While all of the above-described devices do operate as transient suppressing devices, for the family of negative resistance devices, once a breakdown device is triggered by a transient, its voltage drops substantially, for example, to 15 volts for a gas discharge tube, and on the order of 2 volts for a semiconductor device. If this breakdown voltage is lower than the voltage of the source to which it is connected, the device will continue to draw current, known as follow-on current, after the transient energy has been absorbed. Such follow-on current may be of sufficient amplitude to destroy the device and trip a circuit breaker. The family of non-linear resistance elements, without negative resistance characteristics have the disadvantage that, despite their non-linear voltage characteristics, the voltage across such devices does tend to rise at high current levels.

SUMMARY OF THE INVENTION

Accordingly, it is an object of the present invention to provide a multicomponent transient suppression system that overcomes many of the disadvantages of the prior art transient suppressors.

It is another object of the present invention to provide a transient suppression system wherein the power generated by a transient is shared among multiple components so that larger transients may be effectively suppresed without damaging the components.

It is yet another object of the present invention to provide a transient suppression system that utilizes a breakdown device in series with a non-linear resistance device to provide improved transient suppression.

It is yet another object of the invention to provide a multistage transient suppressor that utilizes a plurality of series-connected combinations of breakdown devices and non-linear resistance devices connected in cascade in a manner so as to share the transient energy among the devices and provide a suppression system having a lower dynamic resistance in which the dissipation capacity may be accurately controlled.

It is yet another object of the invention to use series connected non-linear devices to limit the follow-on current of the power source.

DESCRIPTION OF THE DRAWING

These and other objects and advantages of the present invention will become readily apparent upon consideration of the following detailed description and attached drawing, wherein:

FIG. 1 is a simplified schematic diagram illustrating the operation of the system according to the present invention;

FIG. 2 is a graph illustrating the transient response of the circuit illustrated in FIG. 1;

FIG. 3 is an alternative embodiment of the circuit illustrated in FIG. 1;

FIG. 4 illustrates a multistage version of the transient suppression circuit according to the present invention;

FIG. 5 is a graph illustrating the transient response of the circuit of FIG. 4; and FIG. 6 is a circuit diagram of a practical embodiment of transient suppression system according to the invention.

DETAILED DESCRIPTION OF THE PREFERRED EMBODIMENT

Referring now to the drawing, with particular attention to FIG. 1, a transient surge suppressor according to the invention utilizes a breakdown device, for example, a gas discharge tube 12 connected in series with a non-linear resistance element, such as, for example, a varistor 14. The series-connected elements 12 and 14 are connected across a pair of lines to be protected, such as a power main 16.

Assuming that the power main 16 is a 120 volt RMS AC 60-cycle power main, the peak voltage applied across the series combination of the gas discharge tube 12 and the varistor 14 is 120 volts times the square root of two, or approximately 170 volts. Thus, the component values of the gas tube 12 and the varistor 14 should be chosen such that the gas tube 14 is not triggered by the peaks of the line voltage. Thus, if a gas discharge tube having a trigger voltage of 145 volts is selected as the gas discharge tube 12, and a varistor having a nominal voltage of 100 volts, such as for example, the ERZ-C20DK101 manufactured by Panasonic, is used as the varistor 14, the series combination will not be triggered by the 170 volt peaks of the alternating current wave. However, if a transient appears on the line 16, such as a transient illustrated by the line 20 (FIG. 2), the gas discharge tube 12 will trigger when the voltage across its terminals exceeds 145 volts, which corresponds to approximately 245 volts across the series combination of the tube 12 and varistor 14, as is illustrated by the point 22 of FIG. 2. When the gas discharge tube 12 triggers, the gas in the tube ionizes, the negative resistance phenomenon occurs and the voltage across the tube drops to the glow voltage, nominally about 60 to 75 volts. This reduces the voltage across the series combination to about 160 volts, as illustrated by the plateau 24 in the graph of FIG. 2.

As the current through the discharge tube 12 increases further, the tube is driven into its arc mode wherein the voltage across its terminals drops further. Typically, the arc mode voltage or arc voltage of a gas discharge tube is nominally 15 volts, and the voltage across the series combination is then reduced to approximately 115 volts as is illustrated by the point 26 of FIG. 2.

As the transient continues and the current through the gas discharge tube 12 and the varistor 14 increases due to its dynamic resistance, the voltage across the varistor 14 will increase, first at a fairly gradual rate, and then more rapidly as the current through the varistor 14 increases. This results in a gradual increase in the voltage across the combination, as is illustrated by the curve 28 of FIG. 2. This voltage will continue to rise to a maximum point 30 which is determined by the maximum current produced by the transient. Once the transient energy has been dissipated, the current through the gas discharge tube produced by the power line voltage will drop below the level necessary to sustain ionization. Also, since a substantial portion of the power line voltage will appear across the non-linear resistance device, the voltage present across the gas discharge tube will be below the voltage needed to sustain conduction. Thus, the discharge tube will switch to its nonconductive state; and because the values of the voltages of the discharge tube and the varistor have been chosen such that the peak of the line voltage will not cause the discharge tube to be triggered, the tube will remain nonconductive until the next transient occurs. Similar operation will occur when a SIDAC or other similar device is used as a breakdown device and when another device is used as the non-linear resistance element. However, the values of the devices must be selected so that the peak of the line voltage waveform, when applied to the series combination of the breakdown device and the non-linear resistance element, is insufficient to cause the breakdown device to switch to its conductive state. The resistance of the non-linear resistance device is chosen to limit the current flowing through the breakdown device to a level below that required to make the breakdown device remain conductive after the transient has passed.

If the maximum voltage 30 can be tolerated by the equipment being protected, then a single-stage circuit such as the one illustrated in FIG. 1 is sufficient to protect the equipment. However, if the equipment cannot tolerate a voltage as high as the voltage 30, then additional protection must be provided. Such additional protection can take the form of additional stages similar to the stage illustrated in FIG. 1, as will be discussed in a subsequent portion of the specification.

While the circuit illustrated in FIG. 1 utilizes a gas discharge tube 12 as the negative resistance breakdown device and a varistor 14 as the non-linear resistance device, other components may be used. For example, a solid state device, which may be a bi-directional switch such as a SIDAC 32, may be used instead of the gas discharge tube 12. Another non-linear resistance device such as a Zener diode, a selenium stack or a voltage dependent resistor, all of which are generally designated by the reference numeral 34, may be used in place of the varistor 14. If desired, a resistor 36 may be placed in series with the solid state devices to control the curvature and rate of rise of voltage across the dynamic resistance, whose curve is indicated in 26, 28 and 30 of FIG. 2. Resistor 36 also provides protection for the solid state devices.

The operation of the circuit illustrated in FIG. 3 is similar to the one illustrated in FIG. 2, with the shape of the transient response curve being similar to the curve illustrated in FIG. 2; however, the voltages of the various transition points will be different, and will be dependent upon the breakover point of the SIDAC 32. The breakover point of a SIDAC can be controlled over a wide range of voltages; however, a breakover voltage of on the order of 180 volts would be suitable for use with 120 volt AC power main.

When a SIDAC breaks over, there is no intermediate region such as the glow region 24, but rather, the device switches directly to its maximum conduction state. The on state voltage of a SIDAC is on the order of 2 volts. Thus, the lack of an intermediate glow voltage, and the fact that the 2-volt forward conduction voltage drop is lower than the 15 volt arc voltage of a glow discharge tube will affect the specific shape of the transient curve; however, the general shape of the curve will still be similar to the curve illustrated in FIG. 2.

As previously stated, in some instances it is desirable to use multiple stages of suppression in the event that one stage is not sufficient to protect the circuitry being protected. One embodiment of such a multiple-stage system is illustrated in FIG. 4. In the system illustrated in FIG. 4, a gas discharge tube 42 is connected in series with a varistor 44. The gas discharge tube 42 and the varistor 44 may be similar to the respective gas discharge tube 12 and the varistor 14 of FIG. 1. The series combination is connected across a line 46. A second stage including a gas discharge tube 48 and a varistor 50 is coupled to the first stage by means of a waveform integration circuit to provide a rise time delay network including an inductor 52 and a capacitor 54. Other stages may be added as required, with a typical additional stage being a series-connected combination of a discharge tube 56 and a varistor 58 that is coupled to the prior stages by an inductor 60 and a capacitor 62.

The transient response of a multistage system such as the one illustrated in FIG. 4 is illustrated in FIG. 5. Whenever a transient occurs, the voltage across the device increases as is illustrated by the line 70 until the gas discharge tube 42 triggers at point 72 due to its negative resistance characteristics. The voltage then drops to a voltage 74 during the glow mode of the discharge tube and then to a voltage 76 when the arc mode is reached. As the transient current increases due to the dynamic resistance of the varistor, the voltage rises along the line 78. The portions 70, 72, 74, 76 and 78 of the graph of FIG. 5 correspond to the respective portions 20, 22, 24, 26 and 28 of the graph of FIG. 2. Again due to the dynamic resistance of the varistor the voltage continues to rise along the line 78, the device 48 breaks down at a point 80 and goes through its glow mode and its arc mode, thus resulting in voltages 82 and 84. As the current continues to increase, the voltage across the suppressor continues to increase along the line 86. If the current caused by the transient is sufficient to raise the voltage to a point 88, the gas discharge tube 56 will enter the negative resistance mode. This brings the voltage down again as the discharge tube 56 goes through its glow mode, which corresponds to the plateau 90, and into its arc mode which corresponds to the point 92. The process continues as is illustrated by the curve 94 until either the energy in the transient is dissipated or all stages in the suppressor are triggered.

In order to obtain efficient dissipation of the transient energy, it is necessary to assure that the triggering of a discharge tube in a subsequent stage does not extinguish the already triggered discharge tube of a previous stage. If this were to occur the transient energy would not be shared among the various elements, and could damage the subsequent stages.

The proper sequential triggering of successive breakdown devices is accomplished by making the voltage that corresponds to the arc mode voltage across each succeeding series-connected stage higher than the corresponding voltage for the previous stage. For example, the voltage at point 84 (FIG. 5) is greater than the voltage at point 76, and the voltage at point 92 is greater than the voltage at point 84. This assures simultaneous conduction and that the triggering of each succeeding stage does not extinguish a previous stage, thereby assuming simultaneous conduction, and is accomplished by making the nominal voltage of the varistors used in succeeding stages higher than the voltages of the varistors used in the previous stages. For example, a varistor having a nominal voltage of 100 volts can be used as the varistor 44 (FIG. 4), and a 120 volt varistor used as the varistor 50, with subsequent varistors each having a slightly higher voltage rating. Also, the electrical characteristics of the gas discharge tubes may be altered to achieve this condition, and different devices could be used in the different stages. For example, a gas discharge tube may be used as the breakdown device in one stage while a SIDAC may be used in another. Also, other combinations of various breakdown devices, Zeners, varistors and resistors can be used, depending on the application.

Referring to FIG. 6, there is illustrated a practical multistage transient suppressor according to the invention. The system includes an input connector, which may conveniently be a male three-prong grounded plug 102, and an output connector which may be a matching grounded outlet. The circuit illustrated in FIG. 6 employs a pair of gas discharge tubes, for example, a pair of 145 volt gas discharge tubes 106 and 108. A varistor, preferably a 100 volt varistor, such as, for example, a Panasonic ERZ-C20 DK100 varistor, is used as the varistor 110 and is connected in series with the gas discharge tube 106. Another varistor, having a higher nominal voltage, such as, for example, a 120 volt varistor such as the Panasonic ERZ-C20 DK121 is connected in series with the gas discharge tube 108. The two stages are coupled together by a pair of wires having a plurality of ferrite beads 114 and 116 disposed thereon to form an inductance. The inductance cooperates with a capacitor 118 to delay the transient voltage rise time applied to the discharge tube 108 in order to prevent overshoot that could be caused by a transient having a steep wavefront. A pair of capacitors 120 and 122 shunt the respective discharge tubes 106 and 108 to prevent false triggering of the discharge tubes. Other transients, noise and extraneous signals on the lines are shunted to ground by a pair of capacitors 124 and 126. A final stage comprising four bi-directional Zener diodes 128, which may be, for example, 200 volt Zener diodes, are coupled to the previous stages by a pair of inductors formed by a plurality of ferrite beads disposed on the lines interconnecting the Zener diodes with the previous stages. A fuse 134 protects the device from damage in the event of excessively high transients or other circuit abnormalities such as, for example, short circuits at the output of the protection circuit.

In operation, and under normal line conditions, none of the devices in the transient suppression system are triggered. However, in a manner similar to that of the circuits previously discussed and graphically illustrated in FIG. 5, as the transient voltage rises above the trigger voltage of the discharge tube 106, the voltage across the discharge tube 106 drops, thereby dropping the voltage across the combination of the discharge tube 106 and the varistor 110. As the transient continues, the voltage across the combination continues to rise, and after being delayed by the combination of the capacitor 118 and the inductors formed by the ferrite beads 114 and 116, the device 108 triggers. The use of ferrite beads to form the delaying inductors is particularly advantageous because such ferrite beads do not saturate under high currents. The inductance of the inductors formed by the beads 114 and 116 and the capacitance of the capacitor 118 are selected to reduce the steepness of the wavefront of the transient energy sufficiently to permit the gas discharge tube 108 to fire before overshoot occurs. Any remaining transient energy from the output of the second stage is delayed by the inductors formed by the ferrite beads 130 and 132 and applied to the Zener diodes 128. The Zener diodes 128 serve to reduce the amplitude of any remaining transients and to reduce the dynamic impedance of the system.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A transient surge suppression system comprising:
   a pair of input terminals;
   a first gas discharge tube connected in series with a first resistance device to form a first series combination coupled between a second pair of terminals providing a single electrical conduction path therebetween, said second pair of terminals being connected across said input terminals;
   a second gas discharge tube connected in series with a second resistance device to form a second series combination coupled between a third pair of terminals providing a single electrical conduction path therebetween;
   an integrating delay circuit coupling said second and third pairs of terminals wherein at least one terminal of said second pair of terminals is connected in common with one terminal of said third pair of terminals; and
   a pair of output terminals electrically coupled to said third pair of terminals.

2. A transient surge suppressor as recited in claim 1 wherein the values of said gas discharge tubes and said resistance devices are selected to prevent holdover current.

3. A transient surge supression system as recited in claim 1 wherein said first resistance device is a non-linear resistance device.

4. A transient surge suppression system as recited in claim 3 wherein the other of said first and second resistance devices is a non-linear resistance device.

5. A system as recited in claim 3 wherein one of said first and second resistance devices is a Zener diode.

6. A transient surge suppression system as recited in claim 3 wherein one of said first and second resistance devices is a selenium stack.

7. A transient surge suppression system as recited in claim 3 wherein one of said first and second resistance devices is a voltage variable resistor.

8. A transient surge suppression system as recited in claim 1 wherein said second resistance device has a resistance higher than the resistance of said first resistance device.

9. A transient surge suppression system as recited in claim 1 wherein said integrating delay circuit includes an inductor and a capacitor.

10. A transient surge suppression system as recited in claim 9 wherein said inductor includes a ferrite bead.

11. A transient surge suppression system as recited in claim 10 wherein said first resistance device is a varistor.

12. A transient surge suppression system as recited in claim 11 wherein said second resistance device is a varistor.

13. A transient surge suppression surge as recited in claim 1 wherein said system includes a third gas discharge tube connected in series with a third resistance element to form a third series combination interposed between said second series combination and said output terminals.

14. A transient surge suppression system as recited in claim 13 furthur including a second integrating delay circuit coupling said third series combination to said second series combination.

15. A transient surge suppression system as recited in claim 14 wherein said second integrating delay circuit includes a second inductor and a second capacitor.

16. A transient surge suppression system comprising:
a pair of input terminals;
a first SIDAC device connected in series with a first resistance device to form a first series combination coupled between a second pair of terminals providing a single electrical conduction path therebetween, said second pair of terminals being connected across said input terminals;
a second SIDAC device connected in series with a second resistance device to form a second series combination coupled between a third pair of terminals providing a single electrical conduction path therebetween;
an integrating delay circuit coupling said second and third pair of terminals wherein at least one terminal of said second pair of terminals is connected in common with one terminal of said third pair of terminals; and
a pair of output terminals electrically coupled to said third pair of terminals.

* * * * *